C. J. LANDIN.
MACHINE FOR COVERING CIRCULAR OBJECTS.
APPLICATION FILED NOV. 15, 1911.

1,053,408.

Patented Feb. 18, 1913.
6 SHEETS—SHEET 1.

WITNESSES.
M. G. Crogan
J. Murphy

INVENTOR.
Carl John Landin
BY
Jas. H. Churchill
ATTORNEY.

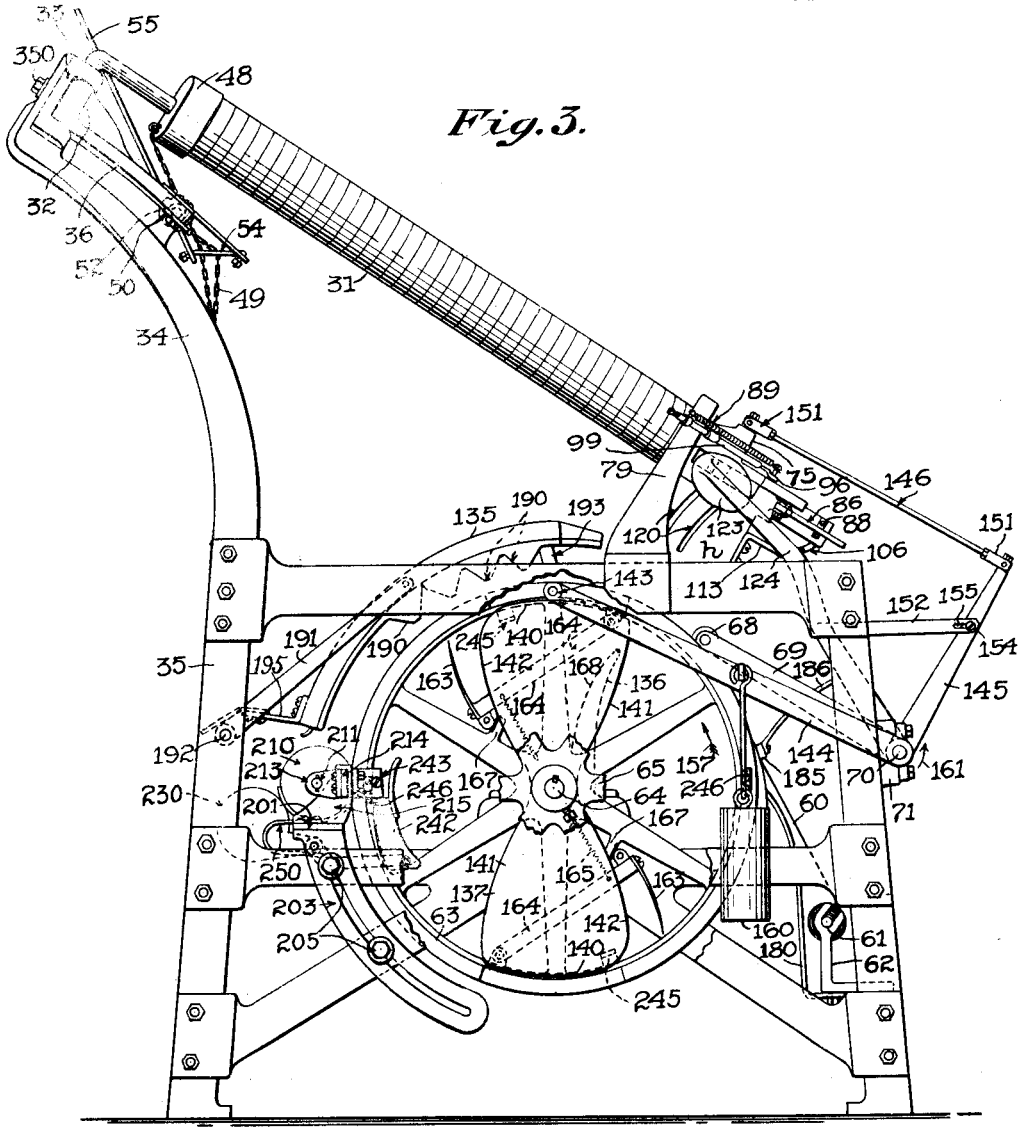
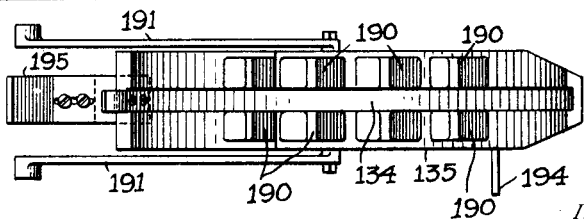

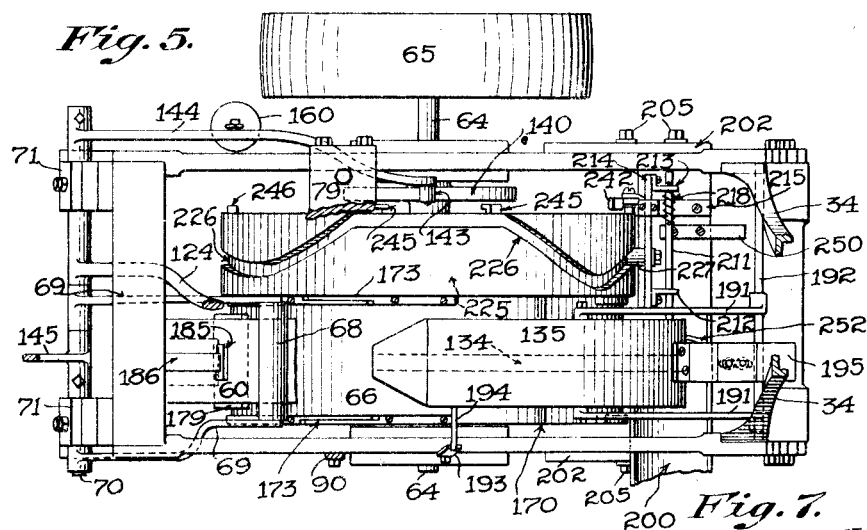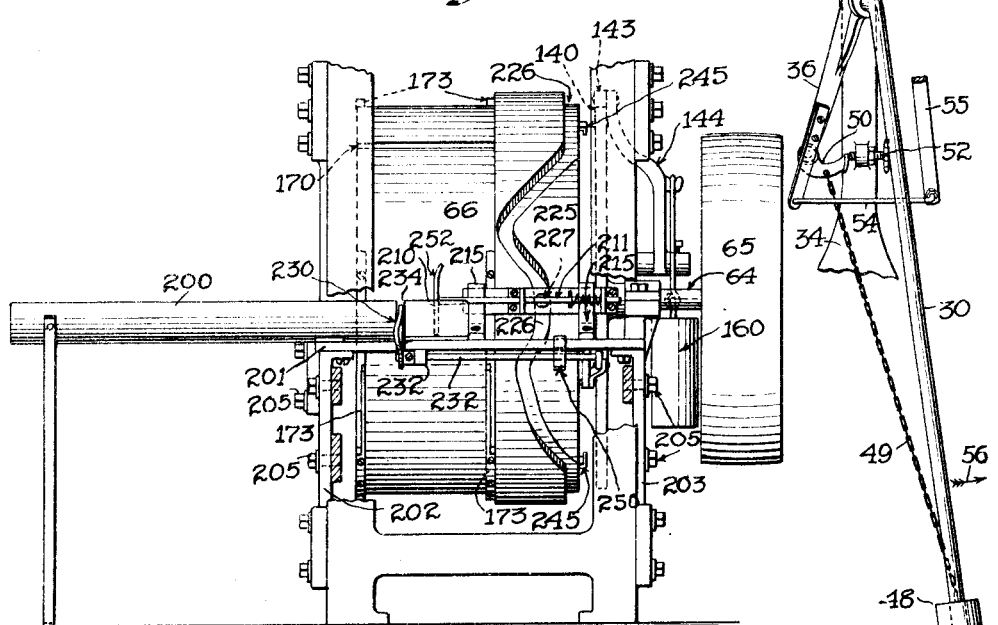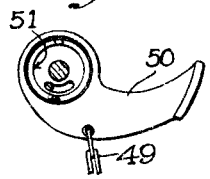

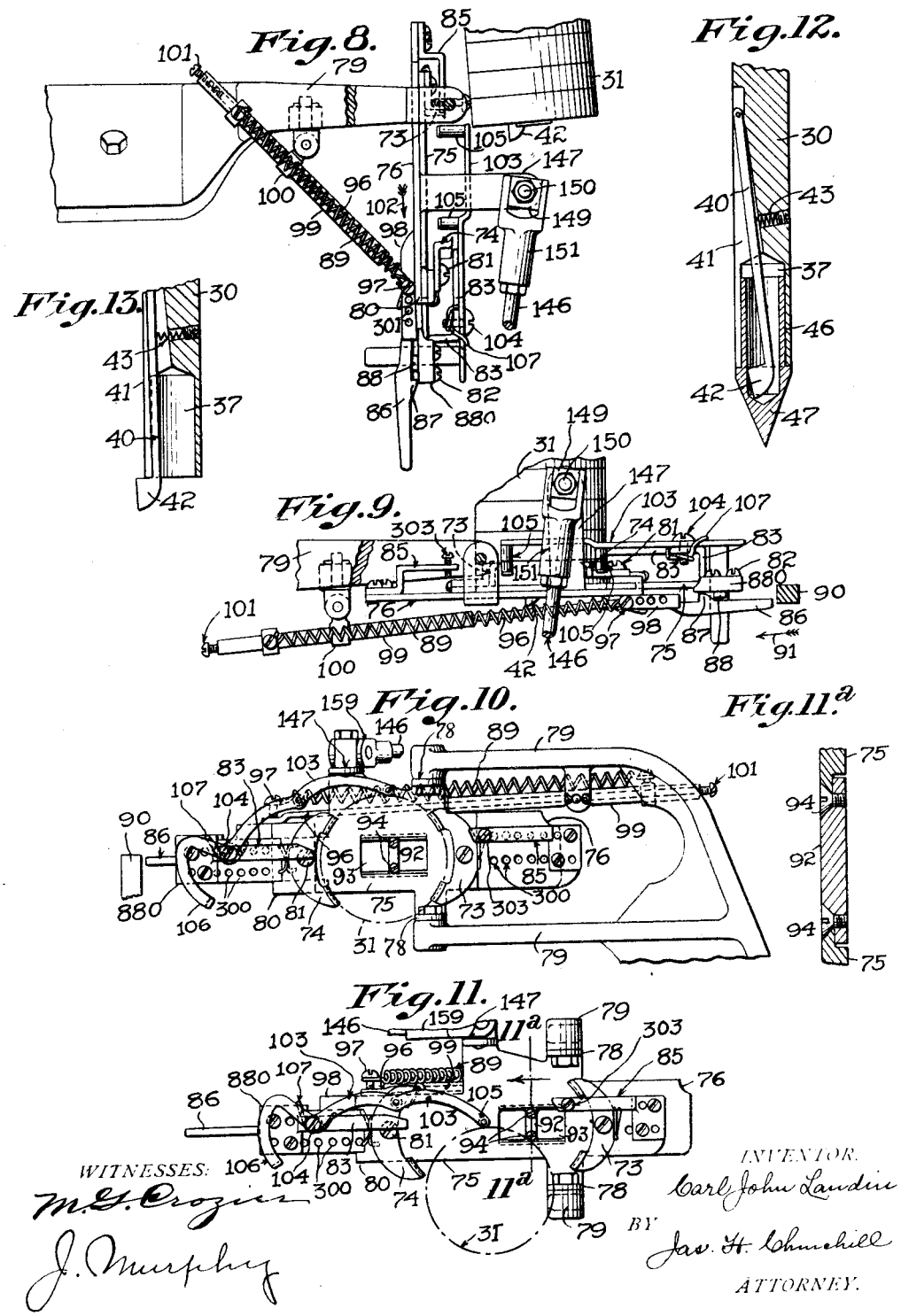

C. J. LANDIN.
MACHINE FOR COVERING CIRCULAR OBJECTS.
APPLICATION FILED NOV. 15, 1911.

1,053,408.

Patented Feb. 18, 1913.

6 SHEETS—SHEET 5.

WITNESSES:
M. G. Crozier
J. Murphy

INVENTOR.
Carl John Landin
BY
Jas. H. Churchill
ATTORNEY.

C. J. LANDIN.
MACHINE FOR COVERING CIRCULAR OBJECTS.
APPLICATION FILED NOV. 15, 1911.
1,053,408.
Patented Feb. 18, 1913.
6 SHEETS—SHEET 6.
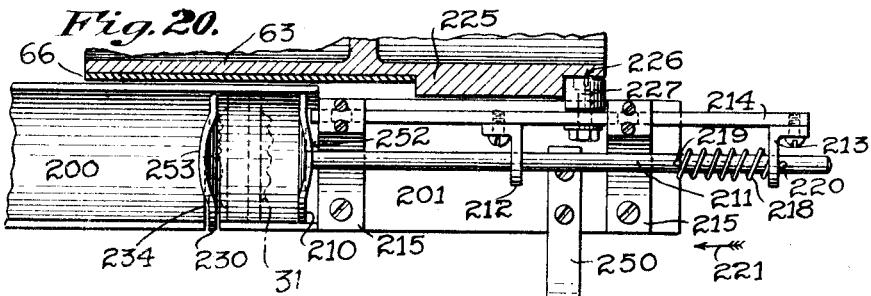
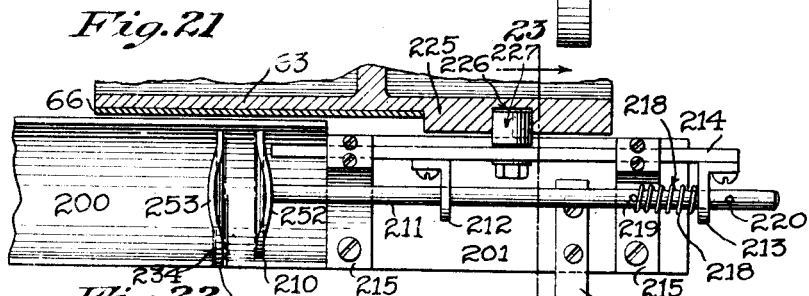
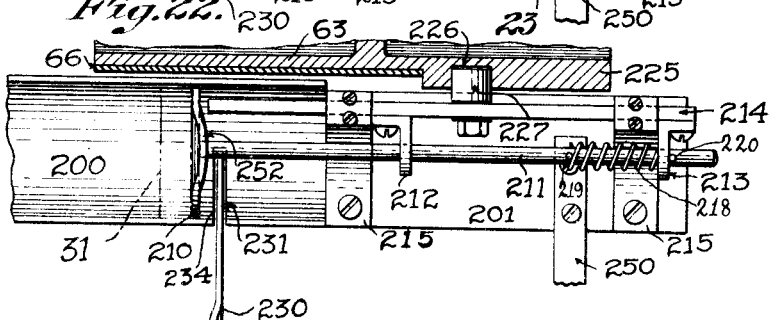
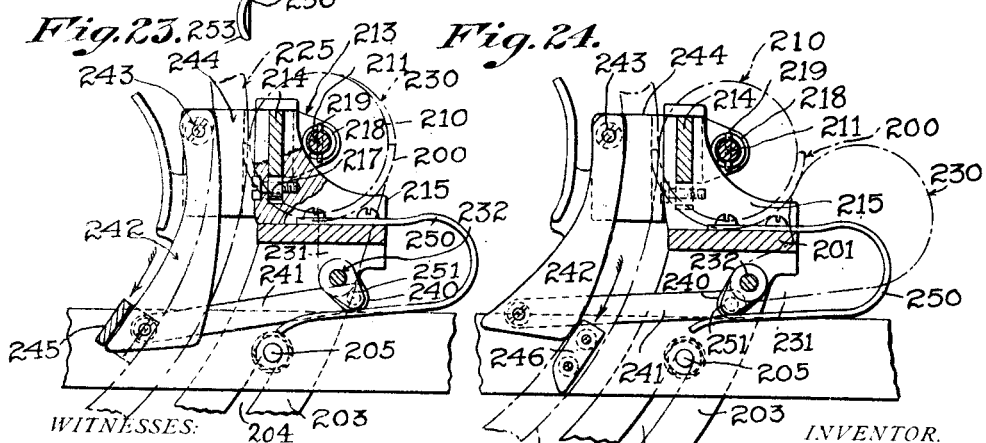
WITNESSES:
M. G. Crozier
J. Murphy
INVENTOR.
Carl John Landin
BY
Jas. H. Churchill
ATTORNEY.

UNITED STATES PATENT OFFICE.

CARL JOHN LANDIN, OF BOSTON, MASSACHUSETTS, ASSIGNOR TO BOSTON WOVEN HOSE AND RUBBER COMPANY, OF CAMBRIDGE, MASSACHUSETTS, A CORPORATION OF MASSACHUSETTS.

MACHINE FOR COVERING CIRCULAR OBJECTS.

1,053,408. Specification of Letters Patent. Patented Feb. 18, 1913.

Application filed November 15, 1911. Serial No. 660,377.

*To all whom it may concern:*

Be it known that I, CARL JOHN LANDIN, a citizen of the United States, residing in Boston, county of Suffolk, and State of Massachusetts, have invented an Improvement in Machines for Covering Circular Objects, of which the following description, in connection with the accompanying drawings, is a specification, like letters on the drawings representing like parts.

This invention relates to a machine for covering circular objects with sheets or layers of flexible material, and the invention is herein shown as embodied in a machine for covering rolls of rubber covered tape with layers of tin-foil, for which purpose it is especially adapted.

The particular features of the invention will be pointed out in the claims at the end of this specification.

Figure 1:
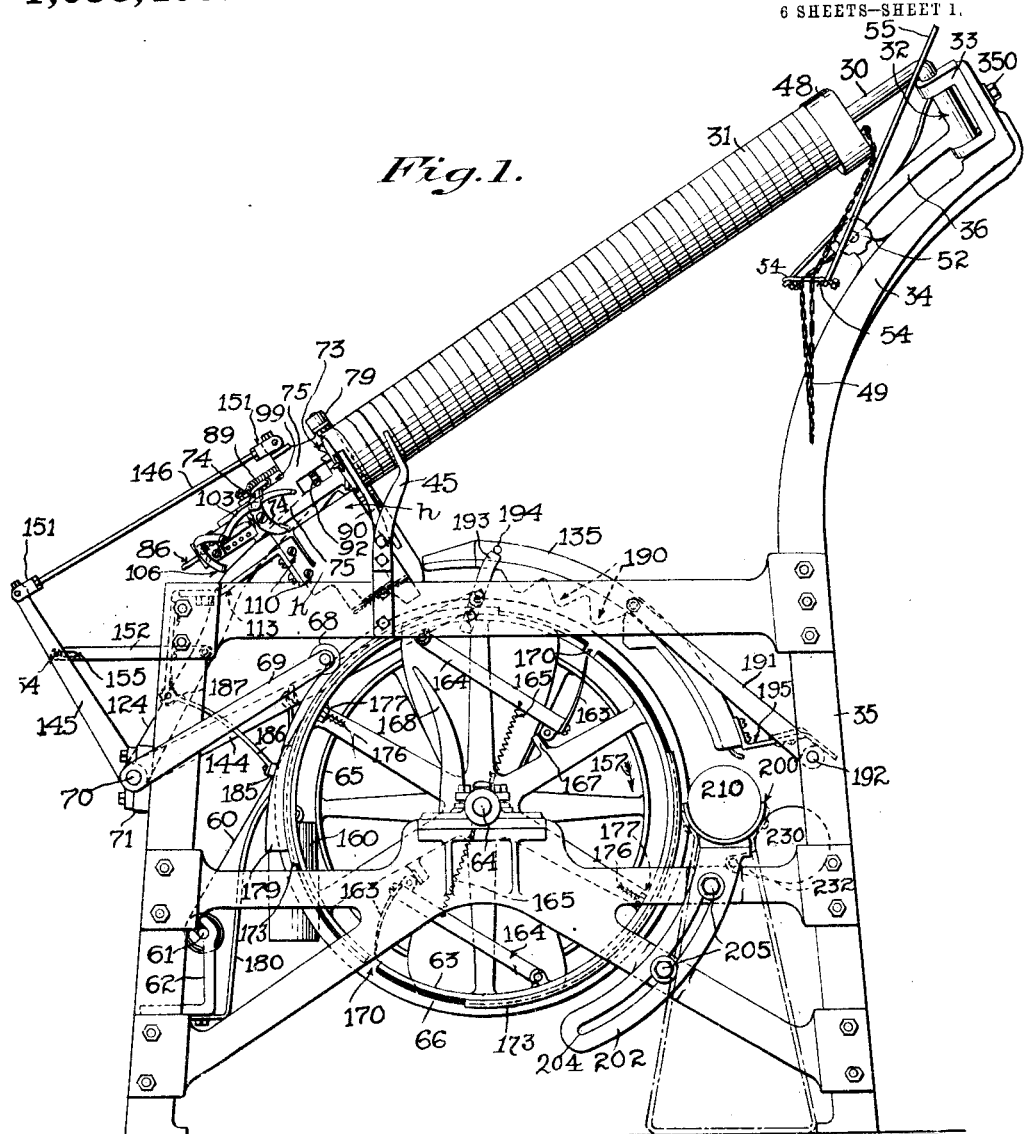
Figure 2:
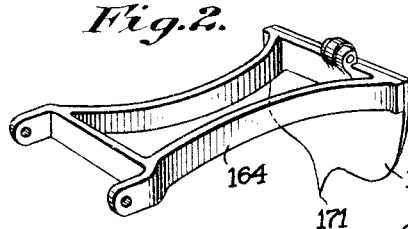
Figure 14:
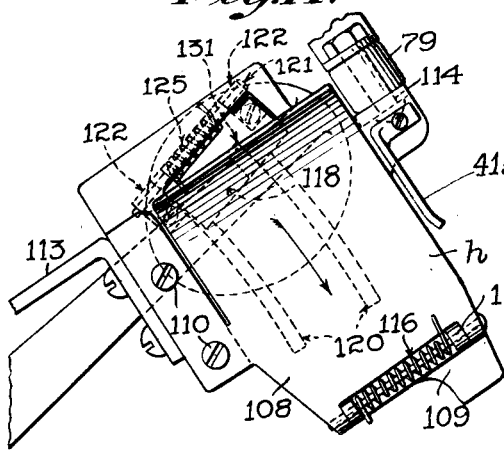
Figure 15:
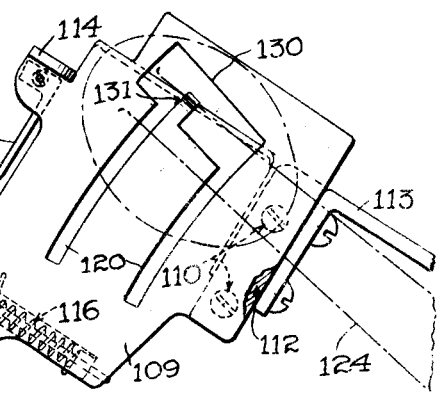
Figure 16:
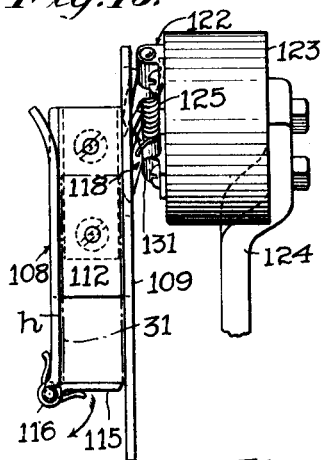
Figures 17, 19:
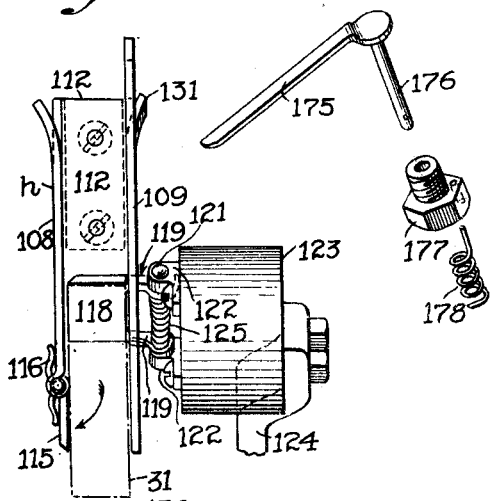
Figure 18:
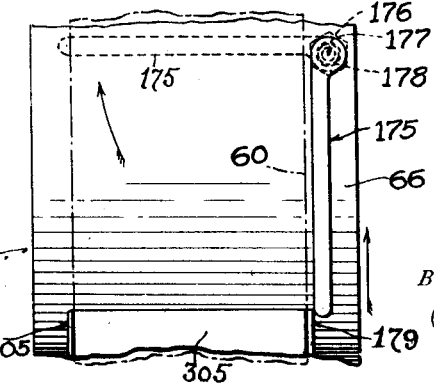

Figure 1 is a side elevation of a machine embodying this invention. Fig. 2 a detail of one of the knives to be referred to. Fig. 3 a side elevation opposite to that shown in Fig. 1 with parts broken away. Fig. 4 an underside view of the folding device to be referred to. Fig. 5 a plan of the machine with parts omitted. Fig. 6 a rear elevation of the machine with parts omitted. Fig. 7 a detail of the holder and automatic starting and stopping arrangement to be referred to. Fig. 7ᵃ a detail to be referred to. Figs. 8, 9, 10 and 11 details on a larger scale to more clearly show the gripping jaws to be referred to. Fig. 11ᵃ a section on the line 11ˣ—11ˣ Fig. 11. Figs. 12 and 13 details in section of the lower portion of the holder for the uncovered rolls. Figs. 14, 15, 16 and 17 details on an enlarged scale of the guiding chute to be referred to. Fig. 18 a detail in plan of a portion of the bed roll and its coöperating wiper. Fig. 19 a detail of the wiper shown in Fig. 18. Figs. 20, 21, 22, 23 and 24 details on an enlarged scale of the compressing mechanism to be referred to.

Referring to the drawings, 30 represents one form of a holder or support for a plurality of rolls 31 of rubber covered tape or other material, to which a covering of tin-foil or other suitable material is to be applied. The holder 30 is shown in the present instance as a downwardly inclined rod, secured at its upper end to a rock shaft or pivot 32, mounted to turn in a bracket 33, secured to an upright arm 34 forming part of the frame work 35 of the machine, by a set screw 350. The rock shaft or pivot 32, in the present instance has extended from it a crank or arm 36, which is offset with relation to the holder 30 as represented in Fig. 7, for a purpose as will be described.

The holder 30 is provided at its lower end with a socket 37 (see Figs. 12 and 13), for the reception of a latch or holding device for retaining the rolls 31 on the holder 30, until removed therefrom as will be described. The latch referred to, consists as herein shown, of a bar or rod 40, pivoted in a slot 41 in the holder 30 and having at its free end a laterally projecting finger 42, which is made long enough to project beyond the outer circumference of the holder 30 and to be engaged by the lowermost roll on the holder, said latch being held in the position just described by a spring 43, acting on the bar 40.

The holder 30 is capable of being turned in a direction laterally with relation to the frame work of the machine and against a stationary arm 45 attached to the frame work, see Fig. 1. To facilitate loading the holder with the rolls 31, a guiding device or loading plug is employed, which is shown in Fig. 12, as a cylinder 46 adapted to be inserted into the socket 37 and provided with a conical head 47, over which the rolls may be slipped onto the holder 30. The holder 30 is provided with a weight for moving the rolls 31 down thereon, said weight being shown as a collar or sleeve 48, which is loose on said holder. In the present instance provision is made for automatically starting the machine by the movement of the holder into its operative position, and for stopping the machine when the weight 48 has moved down on the holder a pre-determined distance, as for instance when the last roll 31 has been removed from the holder. To this end, the weight 48 is connected by a chain 49 or other flexible connection, with a dog or arm 50, which is pivoted to the crank or arm 36, see Fig. 7, and is acted upon by a spring 51, see Fig. 7ᵃ, to turn the dog or arm 50 substantially at right angles to the crank 36 and into position to engage a set screw or stop 52, carried by the arm 34 of the frame work, when the holder is in its operative position and the machine is in operation. The crank 36 is joined by a link 54 with a lever 55, which constitutes a starting device, by which is operated in a manner well understood, a clutch (not shown) on the driving shaft (not shown) in the factory and to which the machine is connected by a suitable belt (not shown). When the machine is in operation, the chain 49 is in a slackened condition as shown in Fig. 1, as the weight 48 is at such time at the upper part of the holder 30, but as the rolls 31 are removed from the holder, as will be described, the weight 48 moves down on the holder, and the slack in the chain is taken up, and at or about the time the last roll 31 is removed from the holder, and the weight 48 brings up against the latch 42, the chain is rendered taut so as to turn the dog 50 on its pivot and withdraw it from engagement with the set screw 52, and thereby allow the holder 30 to swing laterally into its inoperative position against the stationary arm 45. This lateral movement of the holder is effected by offsetting the crank 36 and securing the bracket 33 at an angle with relation to the arm 34. As the holder is moved laterally in the direction indicated by the arrow 56 in Fig. 7, the starting lever 55 is moved in the same direction and throws out the clutch. When the holder is loaded, the machine is automatically started in operation, by the operator moving the holder in the direction opposite to that indicated by the arrow 56, and on this movement, the dog 50 is again brought into engagement with its stop or set screw 52, which retains the holder in its operative position and also retains the clutch (not shown) in its operative position.

The uncovered rolls 31, are in the machine herein shown, automatically removed from the holder, one by one, and carried into operative position with relation to the material 60 which is to be wound thereon. The covering material 60 may and preferably will be tin-foil, which is wound upon a shaft or roll 61, journaled in brackets 62 attached to the frame work, see Figs. 1 and 3, and which passes therefrom onto a movable support, which is herein shown as a rotatable wheel or drum 63, mounted on a shaft 64 supported by the frame work of the machine, and herein shown as provided with a driving pulley 65, which is connected by a suitable belt (not shown) with a pulley (not shown) on the driving shaft (not shown) which is provided with the clutch (not shown) operated by the shipper lever 55 in a manner well understood. The drum or wheel 63 will be hereinafter referred to as the bed roll, and will preferably be provided on its rim with a covering 66 of rubber. The strip 60 of tin-foil is fed from its shaft or roll 61, by the rotation of the bed roll 63, with the covering 66 of which the tin-foil is frictionally engaged by a presser or feed roll 68, journaled in the free ends of levers 69, see Fig. 1, loosely mounted on a rock shaft 70, which is journaled in bearing boxes 71 attached to the frame work of the machine. The weight of the feed roll 68 is sufficient to insure the strip 60 of tin-foil being fed forward as the supporting bed roll 63 is rotated. The uncovered rolls 31 on the holder 30 are taken one by one from the holder and transferred onto the bed roll, so as to have the tin-foil wound on them, and this result is accomplished by suitable mechanism, one construction of which will now be described.

The transfer mechanism herein shown, consists of a pair of gripping jaws 73, 74, see Figs. 8 to 11 inclusive, which are designed to engage the circumference of the uncovered roll 31 at substantially diametrically opposite points, and carriers or supports for said jaws, which are arranged to be turned through an arc of substantially 90°, so as to bring the circumference of the roll held by the jaws, into substantially the plane of the circumference of the rotatable bed roll 63. The gripping jaws 73, 74 are secured, as herein shown to two metal plates or bars 75, 76, one of which is movable longitudinally with relation to the other, to permit the jaws to be opened and closed, as will be described, and said plates may, for sake of distinction, be designated the stationary and movable plates and both constitute carriers for the jaws. The stationary plate 75 is pivoted to the frame work of the machine, and in the present instance, the said plate is provided at one end with ears 78, see Figs. 10 and 11, which are pivotally secured to a yoke or bracket 79 fastened to the frame work. The plate or bar 75 has its opposite end extended through a box-like guide 80, see Fig. 8, formed in the present instance by bending the end of the movable plate 76, and to which the jaw 74 is secured as by the screw 81 or otherwise, said jaw being pivotally mounted on the screw 81 at its center, so that it can rock slightly to adjust it to irregularities in the circumference of the uncovered roll. The stationary plate 75 has adjustably attached to its end beyond the guide 80, as by screws 82, a finger 83, which is extended over the said guide and its jaw 74, for a purpose as will be described. The sliding plate 76 has adjustably attached to its end opposite to the guide 80, a finger 85 which extends over the gripping jaw 73. The gripping jaws in their open position shown in Fig. 8, are normally widely separated, that is, they are separated a greater distance than the diameter of the rolls 31, and they are held in their open position by a holding device, as they are moved into their operative position, said holding device being herein shown as a lever 86, pivoted at one end to a bar 98, secured to the back of the movable plate 76, said lever having a tooth or projection 87, which engages with a lug or projection 88 on a plate 880, secured to the stationary plate 75 by the screws 82, and which is held by a spring 89 against said lug, so as to practically lock the two jaw carrying plates together. The lever 86 has its free end extended beyond the end of the stationary jaw-carrying plate 75, so as to be engaged with a stationary arm 90, see Figs. 1 and 9, which arrests the movement of the lever 86, as the jaw-carrying plates approach the end of their movement toward the roll holder, and effects disengagement of the tooth 87 from the lug 88, at or about the time the jaws 73, 74 have been brought into line with the endmost roll on the holder, thereby unlocking the jaw-carrying plate 76 from the stationary plate 75, and permitting the plate 76 to be moved by the spring 89 in the direction indicated by the arrow 91 in Fig. 9, so as to cause the jaw 74 to firmly grip the endmost roll 31 between it and the jaw 73. The sliding jaw-carrying plate 76 also acts as a releasing device for the gripped roll, and for this purpose it is provided with a cross bar 92, see Figs. 11 and 11ª, which is extended across a slot or opening 93, and is secured by screws 94 to permit the said bar to be adjusted in said slot. The cross bar 92 coöperates with the latch or holding finger 42 for the rolls, and moves the said latch from the position shown in Fig. 13, back into a position within the outer circumference of the holder 30, thereby disengaging the latch from the endmost roll 31 and leaving the latter free to be removed from the holder. As soon as the gripping jaws and the roll carried by them have been moved clear of the holder 30, the latch 42 is returned by the spring 43 to its operative position shown in Fig. 13 ready to arrest the lowermost roll 31 as the series of rolls is fed down on the holder by the weight 48. The gripping jaws with the roll firmly held between them, are moved through an arc of substantially 90° into a position above the bed roll, with the roll 31 in the same vertical plane as the bed roll. The mechanism for moving the gripping jaws and their carrier, toward and away from the roll holder, will be hereinafter described. When the roll 31 carried by the gripping jaws has been brought into the plane of the bed roll 63, the roll 31 is released and passes through a guide or chute h to be described, onto the sheet of tin-foil resting on the bed roll.

The release of the roll 31 from the gripping jaws 73, 74 is accomplished by moving the jaw-carrying plate 76 in the direction opposite to that indicated by the arrow 91 in Fig. 9, which is effected, as herein shown, by a rod 96 pivoted at 97 to the bar 98 attached to the plate 76, said rod sliding in a tube 99, which is mounted in a support 100 pivoted to the bracket 79, see Fig. 8, and has extended into its rear end an adjusting screw or back stop 101, against which the rod 96 strikes and is arrested thereby, so that on the continued backward movement of the gripping jaws, the movable plate 76 is moved by the rod 96 in the direction of the arrow 102, Fig. 8, thereby moving the jaw 74 out of engagement with the roll 31, and at the same time, the finger 85 carried by the plate 76 is caused to push the roll away from the jaw 73 and against the finger 83, which serves in most cases to disengage the roll from the gripping jaws. The movable plate 76 is moved by the rod 96 a sufficient distance to carry the tooth 87 on the lever 86, beyond the lug 88 carried by the stationary plate 75, and into position to engage said lug and hold the gripping jaws open on the movement of the gripping jaws toward the roll holder and until they are released by the stop 90 as above described. To still further insure the disengagement of the roll from the gripping jaws, I have provided a knock-off or striker, which is designed to strike down on the roll and eject it from between the gripping jaws, in case the roll is not freed by the finger 85. The knock-off is herein shown as a lever 103 pivoted at 104 to the finger 83 to move in a vertical plane, and provided with one or more laterally projecting pins 105, which extend toward the stationary plate 75 and above the roll 31 gripped by the jaws 73, 74. The knock-off lever 103 is provided at its rear end with a depending arm 106, which is designed to engage a suitable device as will be described, to cause the lever to be turned on its pivot, so as to lower the front end of the lever and cause one of the pins 105 to strike the roll 31 sufficiently hard to project it downward into the guiding chute h above referred to. The knock-off lever 103 has its front end normally elevated by a spring 107, see Figs. 8 and 11. In the present instance, I have shown one form of guiding chute which I may prefer, see Figs. 14 to 17, and which consists of two substantially parallel plates or side walls 108, 109, secured, as by screws 110, to opposite sides of a block 112, which constitutes the rear wall of the chute and is secured to an arm or bracket 113 fastened to the frame work of the machine. The chute h is supported at its front end by the bracket 79 to which it is attached by the bolt 144, see Fig. 11. The chute h is provided with a short front wall 415, which prevents the roll, as it descends into the chute, from passing out therefrom, but which leaves an opening below it, to permit the roll to be carried out of the chute as will be described. The chute is provided at its lower end with a movable bottom 115, which is herein shown as hinged at one side to the side wall 108, and is normally held in its closed position shown in Fig. 16 by the spring 116.

Provision is made for pushing the roll in the chute h down through the same and into contact with the tin-foil 60 on the bed roll. This result is accomplished, as herein shown, by means of a movable pusher or abutment, in the form of a wing or plate 118 of substantially the width of the chute and provided with side arms 119, which extend through substantially parallel slots 120 in the side wall 109 of the chute, and are mounted upon a pivot 121 supported by ears 122, see Fig. 17, attached to a weight 123, secured to the upper end of a crank or arm 124 loose on the rock shaft 70. The plate 118 is designed to be turned into its operative position crosswise of the chute, as shown in Fig. 17, by a spring 125, encircling the pivot 121, and to be turned into its inoperative position substantially parallel with the side wall 109 of the chute, by the weighted arm 124, when the latter is moved into what may be termed its elevated position, represented in Figs. 3 and 14, in which latter position the chute is unobstructed by the plate 118, so as to permit the roll to descend freely into the chute, when released from the gripping jaws. The plate 118 is permitted to be moved into substantially the plane of the side wall 109 of the chute as represented in Fig. 16, by providing said side wall near its upper end with a slot or opening 130 of substantially the size of the plate, and through which the upper part of the plate may be drawn by the weighted arm, the lower end of the plate being retained in position to again pass down into the chute by an outwardly bent finger 131 extended upwardly from the bottom wall of the slot 130. The roll 31 released from the gripping jaws, drops onto the bottom 115 of the chute, and is forced out of the chute by the movable plate 118, which assumes the crosswise position shown in Fig. 17 when the weighted arm 124 is lowered as will be described. The plate 118 presses upon the top of the roll 31, and overcoming the spring 116 forces the bottom 115 into its open position shown in Fig. 17, and pushes the roll down onto the layer of tin-foil on the bed roll, with sufficient force to cause the roll to be revolved by the bed roll and advanced therewith, until the roll has been removed from the chute and carried into a guideway 134, see Fig. 4, formed in the under surface of a device 135, which may be termed the folding device. As the roll 31 is revolved and carried out of the chute by the bed roll, it picks up the sheet of tin-foil lying on the bed roll, and wraps said sheet partially about its corcumference, thereby forming substantially a cylinder of tin-foil around the roll 31 and extending beyond the opposite sides of said roll. The rotation of the roll 31 is continued by the folding device, which completes the cylindrical envelop, and also folds the projecting ends of the tin-foil against the opposite sides of the roll, as will be described.

The carrier for the gripping jaws 73, 74 is twice moved toward and away from the holder 30, and the movable ejector in the chute is twice operated in each revolution of the shaft 64 of the bed roll, by two heart shaped cams 136, 137 fast on the shaft 64 and located diametrically opposite. Each cam is provided with a circular portion 140 and curved or inclined side portions 141, 142 extended from the opposite ends of the circular portion toward the shaft 64, as shown in Fig. 3. The heart shaped cams have coöperating with them a roller 143, see Figs. 3 and 5, carried by a crank or arm 144 fast on the rock shaft 70, which has fast on it an inclined crank or arm 145, joined by a connecting rod 146 to an arm 147, attached to the stationary jaw-carrying plate 75, see Fig. 8. The connecting rod 146 is connected to the crank 145 and to the arm 147 by swivel joints, which compensate for the movements in different directions of the said crank and arm. Each swivel joint comprises, as herein shown, a block 149 mounted to turn on a vertical pin 150, and a fork sleeve 151 adjustable on the connecting rod and pivoted to the opposite sides of the said block. The crank 145 on the rock shaft 70 is connected with the weighted arm 124 by a link 152, which is pivoted at one end to the arm 124, and is movably connected with the crank 145 by a screw 154 extended through a slot 155. On the movement of the crank 145 toward the bed roll, the weighted arm 124 descends until the roll to be covered rests on the bed roll, whereupon the crank 145 is permitted by the slot and pin connection 154, 155 to move independently of the weighted arm so as to position the gripping jaws with relation to the holder 30. By means of the slot 155, the weighted arm is permitted to descend still farther, so as to enable the pusher or abutment 118 to remain in contact with the roll 31, as the latter revolves out of the chute and until the roll has passed into engagement with the folding device 135. As the bed roll 63 is revolved in the direction of the arrow 157, Figs. 1 and 3, the inclined or curved portion 141 of the cam 136, permits the crank or arm 144 to be lowered by the weight 160 suspended therefrom, and the shaft 70 to be rocked in the direction of the arrow 161, Fig. 3, thereby lowering the arm 124 and simultaneously moving the gripping jaws from the position shown in Fig. 8, in which they are above the guiding chute, into the position shown in Figs. 9 and 10, wherein they are engaged with the lowermost roll 31. On the continued revolution of the bed roll in the direction indicated by the arrow 157, the curved or inclined side 142 of the opposite cam 137, is engaged with the roller 143 and raises the crank 144, thereby rocking the shaft 70 in the direction opposite to that indicated by the arrow 161, Fig. 3, and elevating the weighted arm 124 into substantially the position shown in Fig. 3, so as to clear the chute, and simultaneously swinging the gripping jaws and the roll gripped by them away from the holder 30 and into a position above the chute; and at or about the time the jaws are above the chute, the roll is released by the rod 96 striking the set screw 101, see Fig. 8, and the arm 106 of the knock-off lever 103 is engaged with the weighted arm 124, see Fig. 3, and turned thereby into substantially the position represented in Fig. 11, so as to knock the roll into the chute, from which it is forced on the next downward movement of the weighted arm 124, which takes place when the inclined portion 141 of the cam 137 engages the roller 143. On the continued revolution of the bed roll shaft, the portion 142 of the cam 136 engages the roller 143 and elevates the crank 144 and the weighted arm 124 by means of the crank 145 and link 152.

The sheet of tin-foil which is wound upon each roll 31 is cut from the continuous strip or length 60 of tin-foil fed from the roll or shaft 61, by a knife 163 secured to a pivoted carrier, comprising an open frame 164, which is pivoted on the inner circumference of the bed roll, and is normally held by a spring 165 against a back stop 167 on a spoke of the bed roll. In the present instance, two knives are employed which are located on opposite sides of the center of the bed roll. Each knife carrier in the revolution of the bed roll is brought into engagement with a stationary bar or cam 168, located within the bed roll and suitably secured to the frame work of the machine. The cam 168 is located so as to force the knives 163 out through slots 170 in the bed roll and through the strip or layer 60 of tin-foil, so as to form the sheet of tin-foil which is to be wound around the roll $b'$. The cam 168 is located so as to act on the knife, at or about the time the slot in the bed roll has passed by the feed roll 68, at which time the free end of the cut sheet of tin-foil is engaged by the roll 31 to be covered. To avoid tearing of the tin-foil, each knife is provided with a central point 171, see Fig. 2, by which the tin-foil strip is initially punctured near its transverse center. The stationary cam 168 is preferably located, so as to act on the knife after the slot 170 in the bed roll has passed beyond the feed roll 68, so as to have the tin-foil strip 60 held by the feed roll and the roll 31 on opposite sides of the slot 170 in the bed roll. After a sheet of tin-foil has been cut from the strip of tin-foil, the latter is fed forward by the feed roll 68, which remains in engagement with the bed roll, until the free end of the strip has been advanced into a position below the chute $h$, at which time, the feed roll is elevated from the bed roll by cams 173 on the circumference of the bed roll. Each cam 173 may be composed of two members, see Fig. 6, movable circumferentially of the bed roll, so that the cam 173 may be lengthened or shortened more or less, to enable the feed roll to remain in engagement with the bed roll a shorter or longer time, to obtain a shorter or longer sheet of tin-foil according to the diameter of the rolls 31. As the free end of the strip of tin-foil is being fed forward by the feed roll 68, the cut sheet is being wound upon the roll 31 and carried away from beneath the chute $h$. When the proper length of the strip of tin-foil has been fed forward into a position below the chute $h$, the feed roll is elevated by one of the cams 173 and the feed of the strip stopped. To insure the free end of the tin-foil strip lying in close contact with the bed roll, and to prevent said free end from curling up away from the bed roll to any material extent, the bed roll has pivoted to it near one edge of its periphery one or more wipers, see Figs. 18 and 19, each of which consists of an arm 175, fast on a pivot or shaft 176, extended through a hollow nut 177, screwed through the rim of the bed roll, said shaft projecting beyond the said nut and encircled by a helical spring 178, having one end fastened to the nut and the other end to the shaft, and acting to turn the shaft in the nut, so that the arm 175 extends across the periphery of the bed roll a slight distance above the same. To enable the wiper arm 175 to pass from below to above the tin-foil, a stationary cam 179 secured to the frame work by the bracket 180 is located in the vicinity of the feed roll and below the same, as shown in Fig. 1, so as to be engaged by the wiper arm 175, and cause the latter to be turned from its operative position across the bed roll into its inoperative position circumferentially of the bed roll, as represented in Fig. 18, said cam acting to hold the wiper arm in its inoperative position, until the bed roll has advanced sufficiently to enable the wiper arm to be thrown across the bed roll above the tin-foil. The strip 60 of tin-foil on its passage from the roll 61 to the bed roll, may and preferably will pass under a yielding presser bar 185, carried by an arm 186 pivoted to the frame work and lightly acted upon by a spring 187, see Fig. 1, which holds the strip 60 lightly against a stationary plate 305 secured to or forming part of the cam 179, (see Fig. 18). After the circumference of the roll 31 has been covered or enveloped by the cylinder of tin-foil, it is carried forward by the rotation of the bed roll under the folding device 135 and entered into the guideway 134 in the underside of said device, and on its passage beneath the folding device, the ends of the tin-foil projecting beyond the sides of the roll 31, are folded against the sides of the said roll by folders, in the form of lugs or projections 190 on opposite sides of the guideway 134 as represented in Fig. 4. During the passage of the roll 31 beneath the folding device, the said roll is rotated by the bed roll. The folding device is pivoted at or near its center to levers or arms 191, loosely mounted on a tie rod 192 of the frame work of the machine, see Fig. 5, and said device is supported at its front end by a lug or projection 193 on the frame work, see Fig. 1, which is engaged by a laterally extended pin 194 on the folding device. The rear end of the folding device has attached to it an arm 195, which extends over the tie rod 192. The folding device is preferably made of sufficient weight to cause the covered rolls to be pressed down on the bed roll, with sufficient friction to insure rotation of the rolls on their passage under the said device, and as they are revolved, the covering of tin-foil is effectively folded against the sides of the roll. The covered rolls may be discharged from the machine without further treatment, but it is preferred to deliver them to a compressing mechanism for squeezing the sides of the covering against the sides of the roll. In the present instance, I have shown one construction of compressing mechanism, which I may prefer, but it is not desired to limit the invention to the particular construction shown.

Referring to Figs. 1, 3, 6, 20 to 24, 200 represents a curved plate or trough, which is extended transversely of the machine and is secured to a supporting frame, comprising a cross bar 201 and depending curved arms 202, 203, each provided with a curved slot 204 through which is extended screws or bolts 205, by which the trough and its supporting frame may be adjusted with relation to the folding device, according to the diameter of the covered rolls, and secured in its adjusted position. The trough 200 is adapted to receive the covered roll as it passes from under the folding device, and the portion of the tin-foil covering the sides of the roll of tape is compressed, to compact and smooth the same, and cause it to lie flat against the sides of the roll. For this purpose I employ a compressing mechanism, which may and preferably will be made as herein shown and consists essentially of two members, one of which is movable longitudinally of the trough, and the other radially thereof. The longitudinally movable member may be made as herein shown, and consists of a disk 210 located in the trough, and fastened to the end of a rod 211, mounted in lugs or arms 212, 213 attached to a bar 214, which is movable longitudinally through brackets 215, attached to the cross bar 201 of the trough-supporting frame. The bar 214 constitutes a carrier for the rod 211 and its attached disk 210, and may be mounted to slide on roller bearings 217 carried by the guiding brackets 215, as plainly shown in Figs. 23 and 24. The rod 211 is designed to move simultaneously with the carrier or bar 214 and also independently thereof, and for this purpose, the rod 211 is extended loosely through the lugs or ears 212, 213 and is encircled by a helical spring 218, between a pin 219 on the rod 211 and the lug 213, the said spring acting as a yielding connection between the rod 211 and its carrier 214, by causing a pin 220 on the rod to be maintained in engagement with the lug 213, while the carrier is moved unobstructedly in the direction of the arrow 221, Fig. 20, but when the movement of the disk 210 is resisted by the covered roll, as will be described, the spring 218 is capable of being compressed to permit further movement of the carrier, as represented in Fig. 21. On the return movement of the carrier, the spring 218 expands until the lug 213 strikes the pin 220, after which the rod 211 and the disk 210 are moved with the carrier. Movement of the carrier 214 is effected, as herein shown, by a path cam 225 attached to the circumference of the bed roll, see Figs. 5 and 6, and provided with a cam groove 226, into which is extended a stud or roller 227, secured to the bar or carrier 214.

The coöperating member of the compressing mechanism is herein shown as a disk 230 of substantially the same diameter as the trough, and which is provided with an arm 231, mounted on a rock shaft 232, see Figs. 6, 23 and 24, supported in bearings 233 below the cross bar 201 of the trough-supporting frame. The rock shaft 232 is capable of being rocked as will be described, so as to move the disk 230 into and out of the trough, which is permitted by a slot 234 extended transversely of the trough from one edge toward the center thereof. The disk 230, when in the trough, is held stationary, as will be described, and serves as an abutment for the covered roll to be pressed against by the disk 210, and after the covered roll has been compressed, the abutment disk 230 is moved laterally out of the trough, so as to leave a free passage for the compressed roll, which is then fed forward in the trough so as to make room for the next uncompressed covered roll. The movements of the abutment disk 230 may be effected as will now be described.

The rock shaft 232, see Figs. 6, 23 and 24, is provided with a crank 240, which is connected by a link 241 with one end of a lever 242, pivoted at its opposite end as at 243 to a bracket 244, attached to the trough-supporting frame near one end thereof. The bracket 244 is extended toward the bed roll, so as to bring the lever 242 into the path of two lugs or projections 245, 246 attached to the bed roll, one of which, as 245 is adapted to be engaged with the inner surface of the lever 242, see Fig. 23, and the other 246 with the outer surface thereof, see Fig. 24. The inner and outer surfaces of the lever 242 are curved or cam shaped, so that when the lug 245 engages the inner surface of the lever 242 as shown in Fig. 23, the said lever will be swung backward, and through the link 241 and crank 240, will rock the shaft 232 so as to throw or move the abutment disk 230, up into its operative position within the trough 200, as represented in Figs. 20, 21 and 23; and when the lug 246 engages the outer surface of the lever 242, as shown in Fig. 24, the latter will be swung in the opposite direction, and the shaft 232 rocked so as to move the disk 230 out of the trough. The lugs 245, 246 are arranged on the bed roll, so as to effect these operations at the proper time.

Provision is made for retaining the abutment disk 230 in its operative and inoperative positions, after the lugs 245, 246 have passed out of engagement with the lever 242, and for this purpose I employ a bent spring 250, which is secured at its upper end to the cross bar 201 and has its lower end extended under the rock shaft 232, and into position to be engaged by a crank or arm 251 on said rock shaft. In operation the abutment disk 230 is raised by the lug 245 into the trough, with the compressing disk 210 in its retracted position shown in Fig. 20, and at or about this time, the covered roll passes from under the folding device 135 and drops into the trough between the disks 210, 230. To insure the covered roll being properly positioned in the trough, the disks 210, 230 are provided with outwardly curved or flaring portions 252, 253 respectively, which serve to deflect or guide the covered roll into the trough, in case the said roll should be tilted after leaving the folding device. Assuming the covered roll to be properly positioned between the disks 210, 230, the former is then moved by the cam groove 226 toward the latter, and carries with it the covered roll, which is firmly pressed against the now stationary abutment disk 230, and the covering on the sides of the roll is firmly pressed against the said sides, thereby effectively sealing the roll of rubber covered tape or other material with the tin-foil or other covering material. The disk 210 is moved simultaneously with the carrier 214 by the path cam, until the resistance offered by the compressed roll is sufficient to overcome the spring 218, whereupon the disk 210 remains stationary, while the carrier is further moved by the path cam, which feature enables rolls of different widths to be compressed on the same machine. After the covered roll has been compressed as described, the path cam moves the carrier 214 backwardly or in the direction opposite to that indicated by the arrow 221, until the compressing disk 210 is moved a sufficient distance to release the compressed covered roll, and thus remove the pressure on the abutment disk 230, whereupon the said abutment disk is withdrawn from the trough and moved into its inoperative or dotted line position shown in Fig. 24. While this movement of the abutment disk 230 is taking place, the compressing disk is stationary, which is provided for by the shape of the cam groove 226 of the path cam, and as soon as the abutment disk has been removed from the trough, the compressing disk 210 is moved forward again, so as to feed the completed roll beyond the path of movement of the abutment disk, as represented in Fig. 22, after which the compressing disk is returned to its starting position. The cam groove 226 of the path cam is suitably shaped, as represented in Fig. 6, to effect the above mentioned movements of the compressing disk at the proper time and in the proper order.

The operation of the machine may be be briefly described as follows: Assume the machine at rest. In this condition the starting mechanism represented by the lever 55 is in its inoperative position, and the holder 30 bears against the stop arm 45. The operator places the loading plug 46 in the socket 37 as shown in Fig. 12, and then moves the free end of the holder away from the stop arm 45, a sufficient distance to permit the uncovered rolls 31 to be slipped onto the holder. A plurality of the rolls may be placed on the holder at one time. When the holder has been loaded, as represented in Fig. 1, the plug 46 is removed, and the latch 42 is moved into its operative position shown in Fig. 13, in which position it is engaged with the lowermost roll on the holder, see Fig. 8. The operator then swings the free end of the holder toward the bed roll, until the pivoted dog 50 engages the stop 52 shown in Fig. 7, at which time the clutch or starting device is in its operative position, and power is applied to the bed roll through the pulley 65, to rotate the same and set the machine in operation. By the various mechanisms above described in detail, the lowermost roll on the holder 30 is removed therefrom and deposited into the guide or chute *h* and is forced therefrom down into contact with the sheet of tin-foil or other covering material on the bed roll. The covering is severed from the continuous strip and wound upon the circumference of the roll, and the latter and its covering are carried under the folding device 135, which folds the covering material against the opposite sides of the roll. The covered roll is then deposited in the trough 200 and subjected to pressure on its sides by the disks 210, 230, after which the covered roll is fed forward in the trough, until all the rolls on the holder, but preferably the last one, have been assembled in the trough, at which time the machine is automatically stopped, and the assembled rolls removed from the trough. The uncovered roll which is the last to be removed from the holder is deposited into the chute, at or about the time the machine is stopped by the weight 48 acting on the starting lever 55. In practice, the operator to save time in starting usually places an uncovered roll in the chute, prior to starting the machine in operation. Provision is made for enabling the machine to be used with rolls of different diameters and for this purpose, the jaw-carrying plates or bars 75, 76, are provided at their opposite ends with a plurality of holes 300, see Fig. 10, which enable the fingers 83, 85 to be moved toward or from each other according to the diameter of the rolls 31 being covered, and the block 98 is provided with a plurality of holes 301, which enables the rod 96 to be adjusted according to the diameter of the rolls being covered. The gripping jaw-carriers are preferably pivoted to move away from the roll holder, as by so doing, the endmost roll, when composed of rubber covered tape or like sticky material, is more easily separated from the next roll on the holder with which it makes contact, as the endmost roll is separated from the next roll at one side initially, and to still further insure separation of the endmost roll from the next one on the holder, the finger 85 is provided with a device shown as a screw 303 which in the forward movement of the said finger engages the roll next to the last, and strikes it a blow sufficient to jar it and thereby assist in the separation of the sticky rolls.

In the present instance, the holder 30 is shown as a rod which passes through the center of the rolls, but it is not desired to limit the invention to the particular construction of holder, as other forms of holder may be used when the rolls to be covered are not provided with a central opening.

I have herein shown one construction of machine embodying this invention, but it is not desired to limit the invention to the particular construction shown. Furthermore I have described the invention as embodied in a machine for covering rolls of rubber covered tape with coverings of tin-foil, but it is not desired to limit the invention in this respect, as the machine may be used to cover rolls or cylindrical objects of other material and with other material than tin-foil. So also I have shown the invention as embodied in a machine provided with a holder for a plurality of rolls and with mechanism for transferring the rolls one by one to the bed roll, but it is not desired to limit the invention in this respect, as the feed of the uncovered rolls might be effected by hand, that is, by the operator depositing them in the chute one by one at the proper time. Furthermore I may prefer to provide the machine with a compressing mechanism, but I do not desire to limit the invention in this respect, as the covered rolls could be delivered from the folding device into a suitable receptacle and used in that form or they could be compressed by hand.

Claims:

1. In a machine of the character described, in combination, a rotatable bed roll, a holder for the rolls to be covered movable with relation to said bed roll, a starting device controlling rotation of said bed roll, said starting device being rendered effective by the movement of said holder in one direction and ineffective by movement of said holder in a different direction, means to feed a strip of covering material onto the bed roll, a knife to cut the covering material into sheets, mechanism for transferring an uncovered roll from said holder to said bed roll, means for pressing the uncovered roll against the bed roll to cause the uncovered roll to be revolved and covered on its circumference by a sheet of covering material, a folding device coöperating with said bed roll to press the said roll against the bed roll and to fold the covering material against the sides of said roll, a receptacle into which the covered roll is deposited from said folding device, and means for compressing the material covering the sides of said roll.

2. In a machine of the character described, in combination, a holder for a plurality of rolls to be covered, a rotatable bed roll to support a covering material for said rolls, mechanism for transferring an uncovered roll from said holder to said bed roll, means for pressing the uncovered roll against the bed roll to cause the uncovered roll to be revolved and covered on its circumference by said covering material, a folding device coöperating with said bed roll to press the said roll against the bed roll and to fold the covering material against the sides of said roll, a receptacle into which the covered roll is deposited from said folding device, and means for compressing the material covering the sides of said roll, substantially as described.

3. In a machine of the character described, in combination, a holder for a plurality of rolls to be covered, a rotatable bed roll to support a covering material for said rolls, mechanism for transferring an uncovered roll from said holder to said bed roll, means for pressing the uncovered roll against the periphery of the bed roll to cause the uncovered roll to be revolved by the bed roll and covered on its circumference by said covering material, and a folding device coöperating with said bed roll to press the said roll against the bed roll and to fold the covering material against the sides of said roll.

4. In a machine of the character described, in combination, a rotatable bed roll to support a covering material for the rolls, means coöperating with the sides of the roll for guiding it onto said bed roll, means for pressing said roll against the bed roll to cause the uncovered roll to be revolved by the bed roll and covered on its circumference by said covering material, and a folding device coöperating with said bed roll to press the said roll against the bed roll and to fold the covering material against the sides of the said roll, substantially as described.

5. In a machine of the character described, in combination, a rotatable bed roll, mechanism for controlling the rotation of said bed roll, a holder for uncovered rolls, means for connecting said holder with said controlling mechanism, means for retaining said holder in its operative position and said controlling mechanism in its operative position, and a device movable on said holder and connected with said retaining means to actuate the latter and render said controlling means ineffective, substantially as described.

6. In a machine of the character described, in combination, a rotatable bed roll to support a flexible covering material for uncovered rolls, mechanism coöperating with said bed roll to effect the covering of an uncovered roll with the flexible material by the rotation of said uncovered roll by said bed roll, and a compressing mechanism to compress the covering material against the sides of the uncovered roll while the latter is in contact with the bed roll and is revolved thereby.

7. In a machine of the character described, in combination, a holder for a plurality of uncovered rolls having openings through which the holder extends, said holder having a socket at one end, a latch movable in said socket and normally projected out thereof to engage the endmost roll near its center, gripping jaws coöperating with the lowermost roll to grip the same and with said latch to move the latter into the socket in said holder to permit the gripped roll to be drawn off of said holder, and means to move said gripping jaws, substantially as described.

8. In a machine of the character described, in combination, a holder for a plurality of uncovered rolls, a latch carried by said holder and coöperating with the lowermost roll on said holder to retain the rolls thereon, gripping jaws coöperating with said holder to grip said lowermost roll on substantially diametrically opposite sides of the same and with said latch to release the roll gripped by said jaws, means for moving said jaws away from said holder to withdraw the said roll therefrom, and means to open said jaws and release said roll, substantially as described.

9. In a machine of the character described, in combination, a holder for a plurality of uncovered rolls, a latch carried by said holder and coöperating with the lowermost roll on said holder to retain the rolls thereon, gripping jaws coöperating with said holder to grip said lowermost roll on substantially diametrically opposite sides and with said latch to release the roll gripped by said jaws, means for moving said jaws away from said holder to withdraw the said roll therefrom, means to open said jaws, and a knock-off to strike said roll and discharge it from said jaws, substantially as described.

10. In a machine of the character described, in combination, a rotatable bed roll to support a layer of covering material, a chute coöperating with said bed roll to receive an uncovered roll and provided with means coöperating with the sides of said roll to guide it to said bed roll, and means acting on the uncovered roll within said chute to press the said roll while in the chute against the bed roll and cause the uncovered roll to be rotated by the bed roll and the covering on the latter to be wrapped about the circumference of said roll, substantially as described.

11. In a machine of the character described, in combination, a rotatable bed roll to support a layer of covering material, a chute coöperating with said bed roll to receive an uncovered roll and guide it to said bed roll, and provided with a movable bottom to support the roll deposited into the chute and with a slot in one side, a device movable in said chute to engage the upper surface of the roll therein and extended outside of said chute through said slot, and means located outside of said chute and connected with said movable device to operate it, substantially as described.

12. In a machine of the character described, in combination, a holder for a plurality of uncovered rolls having openings through which the holder extends, said holder having a socket at one end, a latch movable in said socket and normally projected out thereof, and a loading plug inserted into said socket to move the latch thereinto, for the purpose specified.

13. In a machine of the character described, in combination, a rotatable bed roll, a compressing device coöperating therewith and comprising a member movable in the direction of the axis of the bed roll, and an abutment member movable radially with relation to said bed roll, and means carried by said bed roll for effecting movement of said members, substantially as described.

14. In a machine of the character described, in combination, a rotatable bed roll, a compressing device coöperating therewith and comprising a member movable in the direction of the axis of the bed roll, a rod on which said member is mounted, a carrier for said rod, a spring to operatively connect said rod and carrier to permit the carrier to be moved simultaneously with said rod and member and independently thereof, an abutment member with which the compression member coöperates, a lever to which said abutment member is connected, and means carried by said bed roll for moving said carrier and said lever, substantially as described.

15. In a machine of the character described, in combination, a rotatable bed roll, a compressing device coöperating therewith and comprising an abutment member and a compressing member, one of which members is movable into and out of the path of the other member, and means carried by said bed roll for effecting movement of said members, substantially as described.

16. In a machine of the character described, in combination, a rotatable bed roll, a compressing device coöperating therewith and comprising a member movable in the direction of the axis of the bed roll, a path cam carried by said bed roll for effecting movement of said compressing member, an abutment member movable radially with relation to said bed roll, a rock shaft to which said abutment member is connected, a cam lever, means connecting said cam lever with said rock shaft, and cams carried by said bed roll to engage said cam lever and rock said shaft in opposite directions, substantially as described.

17. In a machine of the character described, in combination, a holder for a plurality of rolls, a gripping mechanism for said rolls coöperating with said holder and provided with gripping jaws to engage a roll on substantially diametrically opposite sides of the same and carriers to which said jaws are secured, one of said carriers being movable with relation to the other and radially with respect to the roll, means to move said carriers toward and away from the said holder, means to lock said carriers together with the said jaws in their open position, means to unlock said jaws to permit them to engage a roll on said holder, and means to open said jaws to release said roll, substantially as described.

18. In a machine of the character described, in combination, a rotatable bed roll, mechanism for controlling the rotation of said bed roll, a holder for uncovered rolls, means for connecting said holder with said controlling mechanism, means for retaining said holder in its operative position and said controlling mechanism in its operative position, and a device governed by the rolls on said holder and connected with said retaining means to actuate the latter and render said controlling means ineffective.

19. In a machine of the character described, in combination, a holder for a plurality of uncovered rolls, a latch carried by said holder and coöperating with the lowermost roll on said holder to retain the rolls thereon, gripping jaws coöperating with said holder to grip said lowermost roll on substantially diametrically opposite sides and with said latch to release the roll gripped by said jaws, a pivoted carrier for said jaws, and means for turning said carrier in the arc of a circle to withdraw the roll from said holder and bring it into a position substantially at right angles to that in which it was on said holder.

20. In a machine of the character described, in combination, a rotatable bed roll, means coöperating with the periphery of said bed roll to feed a strip of flexible material onto said bed roll from a continuous strip, a knife to cut the portion of the strip supported by the bed roll from the continuous strip, mechanism coöperating with said bed roll and with the sides of an uncovered roll to present said uncovered roll to said bed roll with the circumference of the uncovered roll resting on the cut portion of the flexible strip, means to press the uncovered roll against the bed roll to cause the latter in its rotation to rotate the uncovered roll and wind the cut portion of the flexible strip thereon, and a compressing mechanism to compress the covering material against the sides of the roll, substantially as described.

21. In a machine of the character described, in combination, a rotatable bed roll, means coöperating with the periphery of said bed roll to feed a strip of flexible material onto said bed roll from a continuous strip, a knife to cut the portion of the strip supported by the bed roll from the continuous strip, mechanism coöperating with said bed roll and with the sides of an uncovered roll to present said uncovered roll to said bed roll with the circumference of the uncovered roll resting on the cut portion of the flexible strip, and means to press the uncovered roll against the periphery of the bed roll to cause the latter in its rotation to rotate the uncovered roll and wind the cut portion of the flexible strip thereon, substantially as described.

22. In a machine of the character described, in combination, a holder for a plurality of rolls, a gripping mechanism for said rolls coöperating with said holder and provided with gripping jaws to engage the roll on substantially diametrically opposite sides of the same, a pivoted carrier to which one of said jaws is secured, a carrier for the other of said jaws mounted on said pivoted carrier to move therewith and to slide thereon radially with respect to the roll, and means to move said carriers in the arc of a circle toward and from said holder, and means to move said sliding carrier on said pivoted carrier to open said jaws, substantially as described.

23. In a machine of the character described, in combination, a holder for a plurality of rolls, a gripping mechanism for said rolls coöperating with said holder and provided with gripping jaws to engage the roll on substantially diametrically opposite sides of the same, and carriers to which said jaws are secured, one of said carriers being movable with relation to the other and radially with respect to the roll, means to move said carriers in the arc of a circle toward and from said holder, means to open said jaws, and a device carried by one of the said carriers to strike the roll and knock it free from the said jaws, substantially as described.

24. In a machine of the character described, in combination, a holder for a plurality of rolls to be covered, a rotatable bed roll to support a covering material for said rolls, mechanism for engaging a roll on the holder and bodily carrying it away from said holder and transferring it to said bed roll in a plane substantially at right angles to that in which it was on said holder, and means for pressing the uncovered roll against the periphery of the bed roll to cause it to be revolved by the bed roll and the covering material to be wound thereon, substantially as described.

25. In a machine of the character described, in combination, a rotatable bed roll provided with a circumferential rim to support a covering material for the rolls to be covered, means located above the bed roll to engage the sides or ends of the uncovered roll and to guide it down onto the covering material on the bed roll and means coöperating with the uncovered roll to press the same down onto the bed roll with sufficient force to cause the uncovered roll to be revolved by the rotating bed roll and the covering material to be wound on the normally uncovered roll, substantially as described.

26. In a machine of the character described, in combination, a rotatable bed roll, means coöperating with said bed roll to feed a strip of flexible covering material onto the periphery of said bed roll, means carried by said rotatable bed roll for cutting a portion of said strip from the remaining portion of the strip while the latter is engaged with the bed roll, a holder for supporting a plurality of uncovered rolls, means for transferring the endmost uncovered roll of said plurality of rolls from said holder to the bed roll with the periphery of the uncovered roll on the cut portion of the covering material, and means coöperating with the uncovered roll to cause the latter to be revolved by the bed roll and thereby wind the cut portion of the covering material upon the periphery of the said uncovered roll.

27. In a machine of the character described, in combination, a rotatable bed roll, means coöperating with said bed roll to feed a strip of flexible covering material onto the periphery of said bed roll, means carried by said rotatable bed roll for cutting a portion of said strip from the remaining portion of the strip while the latter is engaged with the bed roll, means located above the bed roll and coöperating with the sides of the uncovered roll for guiding said uncovered roll down onto the bed roll with the periphery of the uncovered roll on the cut portion of the covering material, and a device for pressing the uncovered roll against the bed roll to cause the latter to revolve the uncovered roll and wind the covering thereon.

28. In a machine of the character described, in combination, a holder for a plurality of rolls to be covered, a rotatable bed roll to support a covering material for said rolls, mechanism for engaging a roll on the holder and bodily carrying it away from said holder and transferring it to said bed roll with the periphery of the uncovered roll in contact with the covering material on the periphery of the bed roll, to enable the said bed roll to effect revolution of the uncovered roll and cause the covering material to be wound thereon, substantially as described.

In testimony whereof, I have signed my name to this specification in the presence of two subscribing witnesses.

CARL JOHN LANDIN.

Witnesses:
 JAS. H. CHURCHILL,
 J. MURPHY.